United States Patent [19]

Buchsel

[11] 4,066,227

[45] Jan. 3, 1978

[54] MEZZANINE STRUCTURE FOR WIDE-BODIED PASSENGER AIRCRAFT

[76] Inventor: Christian K. E. Buchsel, 5900 119th Ave. SE., Bellevue, Wash. 98006

[21] Appl. No.: 705,790

[22] Filed: July 16, 1976

[51] Int. Cl.² ............................................. B64D 11/06
[52] U.S. Cl. ............................... 244/118 P; 105/340
[58] Field of Search ............ 244/118 P, 118 R, 137 P, 244/137 R, 117 R; 105/329 R, 340; 296/28 AB

[56] References Cited

U.S. PATENT DOCUMENTS

| | | | |
|---|---|---|---|
| 2,405,136 | 8/1946 | Dittrich | 105/340 |
| 2,595,607 | 5/1952 | Priebe | 244/118 P |

*Primary Examiner*—Trygve M. Blix
*Assistant Examiner*—Barry L. Kelmachter
*Attorney, Agent, or Firm*—Graybeal, Barnard & Uhlir

[57] ABSTRACT

An elevated deck structure is positionable on the main deck floor in the passenger compartment of a wide-bodied aircraft for providing a mezzanine seating area in the substantially unused upper lobe of the fuselage. A sectioned elongated support wall has a lower portion which is detachably secured to a pair of conventional seat tracks extending longitudinally along the center line of the main deck floor. A plurality of mezzanine floor sections are secured to the top of the support wall and project laterally outward toward the sidewall of the aircraft fuselage. The mezzanine floor is elevated a sufficient distance above the main deck floor to provide passenger seating both in the area under the mezzanine floor on either side of the support wall and on the mezzanine floor itself in the upper lobe of the aircraft. The elevated deck structure is more narrow than the passenger compartment is wide at the mezzanine level so as to leave sufficient clearance for visual access by the mezzanine passengers of the main deck area and windows in the fuselage sidewall. In addition, its lateral extension is limited so as to not restrict overhead clearance on the main deck aisles. At least one stairway is provided at an end of the structure for passenger ingress and egress between the main deck and the mezzanine area. Both the support wall sections and the floor sections are sized to be received through a conventional aircraft passenger door so that the extra seating capacity can be added or removed to meet changing requirements.

18 Claims, 11 Drawing Figures

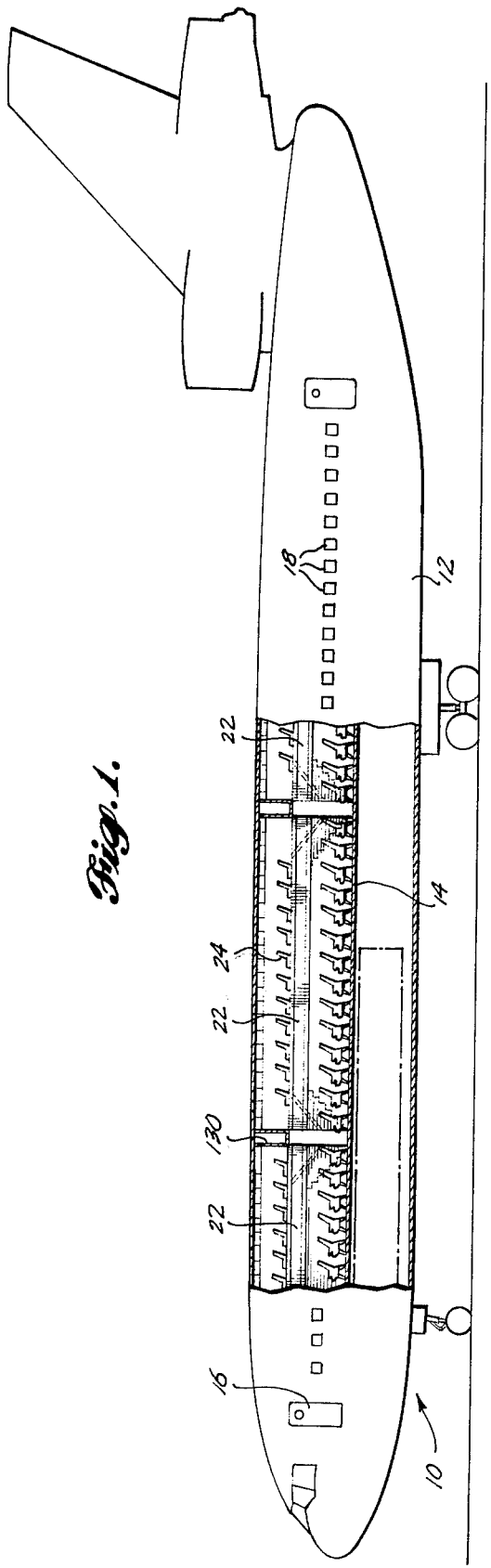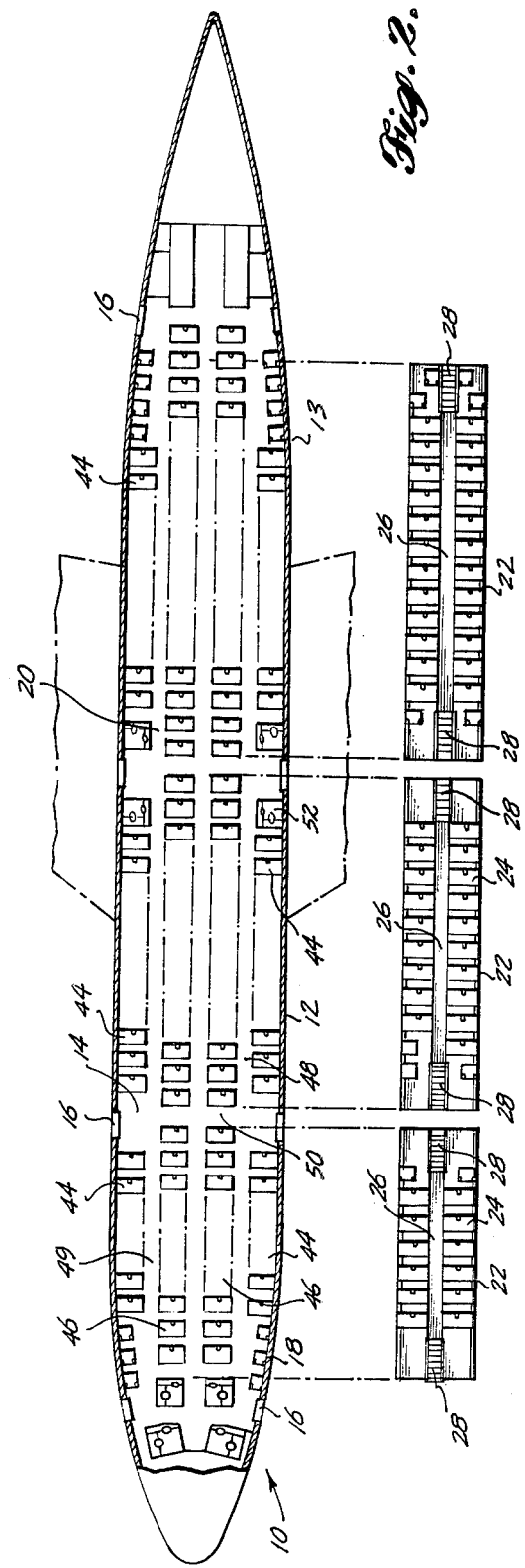

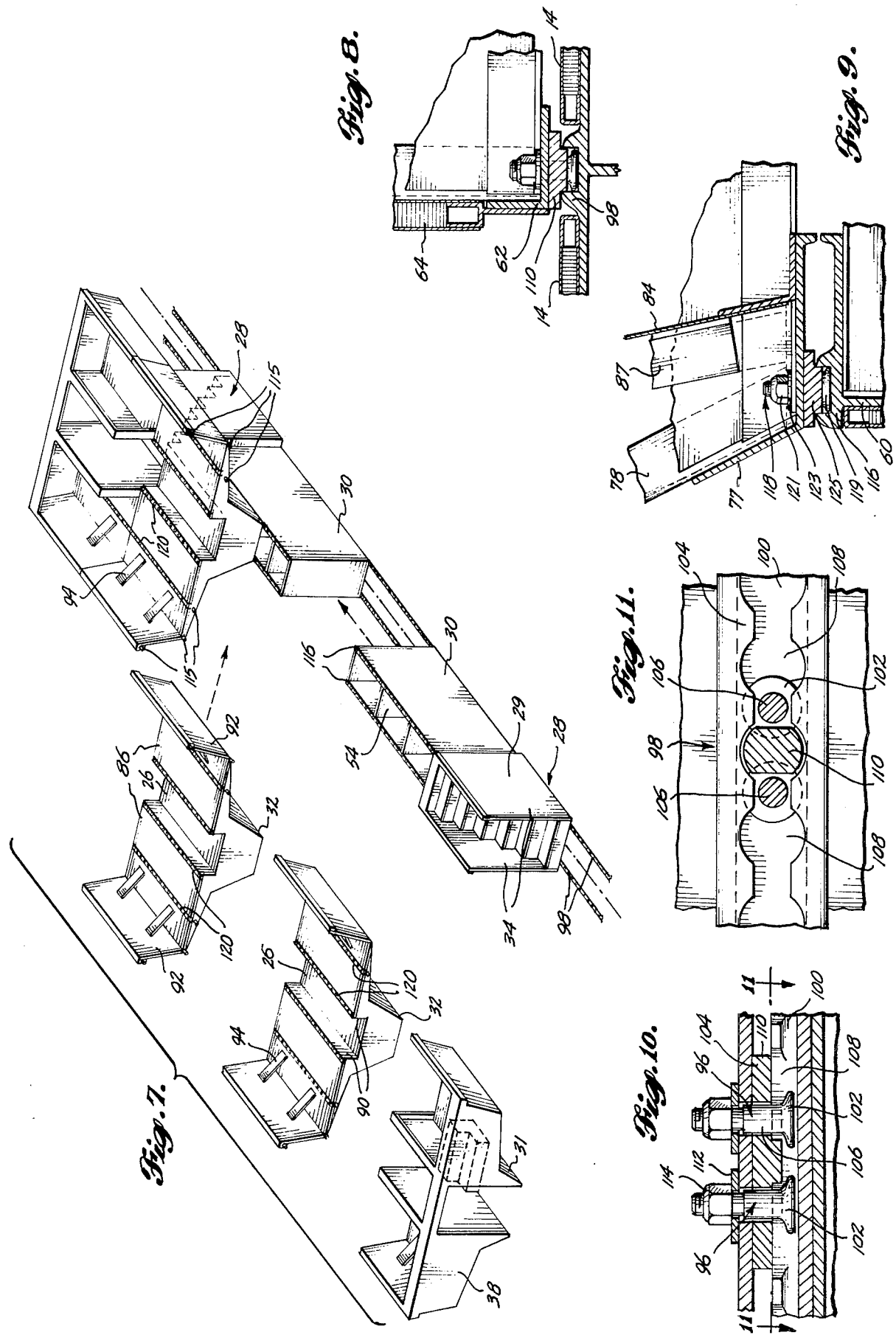

MEZZANINE STRUCTURE FOR WIDE-BODIED PASSENGER AIRCRAFT

BACKGROUND OF THE INVENTION

1. Field of the Invention

This invention relates to a device for increasing passenger seating capacity of a wide-bodied aircraft, and more particularly, to a detachable elevated deck structure which is positionable on the main deck floor of an aircraft to provide additional passenger seating by utilizing the upper lobe of the fuselage.

2. Description of the Prior Art

Prior techniques for increasing the seating capacity of an aircraft have generally involved modification of the external configuration of the fuselage such as by increasing the length, i.e. stretching or other dimension of the aircraft to increase body volume. More recently, the fuselage of wide-bodied aircraft such as the McDonald-Douglas DC 10, the Lockheed L1011 and the Boeing 747 have provided a significant increase in aircraft seating through enlarging both the diameter and the length of the fuselage to create a bigger passenger compartment than in predecessor aircraft. Since body volume is proportional to the third power of body diameter but the floor area available for the main deck seats is proportional to only the second power of the body diameter at a given slenderness ratio, these wide-bodied aircraft envelop a much larger volume per installed seat than the narrow-bodied single aisle aircraft. Accordingly, there is a large amount of upper lobe volume above the main deck floor which is generally not utilized for accommodation of passengers, but rather is only employed for passenger servicing devices such as stowage containers, motion picture projection equipment, air conditioning ducts, etc. Wide-bodied aircraft typically have two aisles, a center section of seats is positioned along the center lane of the main deck floor and standing room is required only in the laterally outward aisles.

Of interest with respect to aircraft seating, is U.S. Pat. No. 2,595,607, granted to B. D. Priebe on May 6, 1952, which describes a seating arrangement for a narrow-bodied aircraft. A two level deck structure (FIGS. 5-7) is positioned within the aircraft fuselage. A plurality of back-to-back seats, a configuration now against federal regulations, are situated on the upper deck and extend longitudinally. An aisle is disposed between each sidewall of the aircraft and the centrally disposed seats providing passenger ingress and egress. A stairway connects the lower level and the upper level. The entire structural configuration is designed to be permanently installed by attachment to the structural components of the aircraft and cannot be conveniently detached therefrom.

Of general interest with respect to a two level deck configuration in a passenger vehicle is U.S. Pat. No. 161,488, granted Jan. 2, 1951 to R. A. Meldrum et al. and U.S. Pat. No. 2,405,136, granted Aug. 6, 1946 to F. W. Dittrich, both of which disclose a double deck railroad vehicle. An upper deck is depicted along a portion of a railroad car and is supported by longitudinally spaced columns attached at their lower end to the bottom deck. The structural configurations described in both disclosures are generally of a permanent nature and cannot be removed when not in use. In addition, they completely divide the vehicle into two separate passenger compartments totally isolating the seated passengers in the upper and lower levels.

SUMMARY OF THE INVENTION

The present invention relates to an improvement in the interior seating efficiency of a wide-bodied aircraft, and more particularly, to an elevated deck structure positionable on the main deck floor of the passenger compartment of an aircraft to provide mezzanine seating within the substantially unused upper lobe portion of the fuselage.

According to an aspect of the invention, an axially elongated support wall is securable to the main deck floor substantially laterally centered within the passenger compartment of a wide-bodied aircraft. A mezzanine floor frame is attached to the top portion of the support wall and projects outwardly over either side of the base. The mezzanine floor is spaced above the main deck floor a sufficient distance to provide for passenger seating on the main deck below the overhanging arms and in the upper lobe portion of the fuselage above the mezzanine floor. The top of the structure is narrower than the width of the passenger compartment at the same level so as to leave space for visual access from the upper to lower level between the outward edges of the mezzanine floor and the sidewall of the aircraft and so as to not restrict head clearance on the main deck aisles.

According to another aspect of the invention, a relatively low cost method of increasing the seating capacity of a wide-bodied aircraft without significant structural modification to the aircraft fuselage is provided by means of an elevated deck structure positionable on the main deck floor of the aircraft. Only minor modification to the supports of the main deck is required for a conventional passenger aircraft to carry the added weight of the mezzanine structure. Only minimal interference is created with the existing passenger seating arrangement on the main deck in that the additional structure only requires the removal of the center column of seats.

According to yet another aspect of the invention, a plurality of longitudinally sectioned support wall members and mezzanine floor members are detachably secured to each other forming an elevated deck structure which is positionable longitudinally along the main deck of an aircraft. Each section is sized to be received through a standard passenger door in the fuselage so that the entire structure can be quickly and easily detachably positioned in the aircraft as required by changing demands for seating capacity.

According to still another aspect of the invention, the interior of a wide-bodied aircraft is interchangeably configured to a plurality of different seating configurations by the use of one or more elevated deck structures. The elevated deck structure utilizes the generally unused upper lobe of a wide-bodied aircraft to provide added area for passenger seating.

According to another aspect of the invention, a detachable elevated deck structure is positionable lengthwise in the fuselage of an aircraft for increasing the seating capacity thereof. The bottom portion of the structure is detachably securable to a pair of seat tracks situated along the center line of the main deck.

According to still another aspect of the invention, a seating configuration for a wide-bodied aircraft is provided which significantly reduces the per passenger operating cost over existing seating configurations. Less fuel per passenger is required since there is less airframe weight and wetted area per passenger. Additionally, due to the lower overall cost per passenger seat within the elevated seating structure, the net profit and return on investment in the aircraft are also increased.

BRIEF DESCRIPTION OF THE DRAWINGS

FIG. 1 is a side elevational view of an aircraft with a portion of the fuselage sidewall cut away illustrating the elevated deck structure of the present invention situated on the main deck floor of the aircraft;

FIG. 2 is a top plan view of the single class interior of the aircraft illustrated in FIG. 1 with the elevated seating structure separated therefrom;

FIG. 7 is a pictorial view of the mezzanine structure of FIG. 3, partially exploded, illustrating its segmented construction;

FIG. 8 is a fragmented view taken along lines 8—8 of FIG. 5 illustrating the detachable connection between the elevated deck structure and the main deck of the aircraft;

FIG. 9 is a fragmented view taken along line 9—9 of FIG. 5 illustrating the connection between the upper and lower sections of the elevated deck structure;

FIG. 10 is an axial-sectional view of a conventional seat track which is of the type normally provided along the main deck of commercial aircraft and is also employed in the instant invention as a fastening assembly disposed between the wall and floor sections of the elevated deck structure; and FIG. 11 is a top view taken along line 11—11 of FIG. 10.

DESCRIPTION OF THE PREFERRED EMBODIMENT

Figure 3:
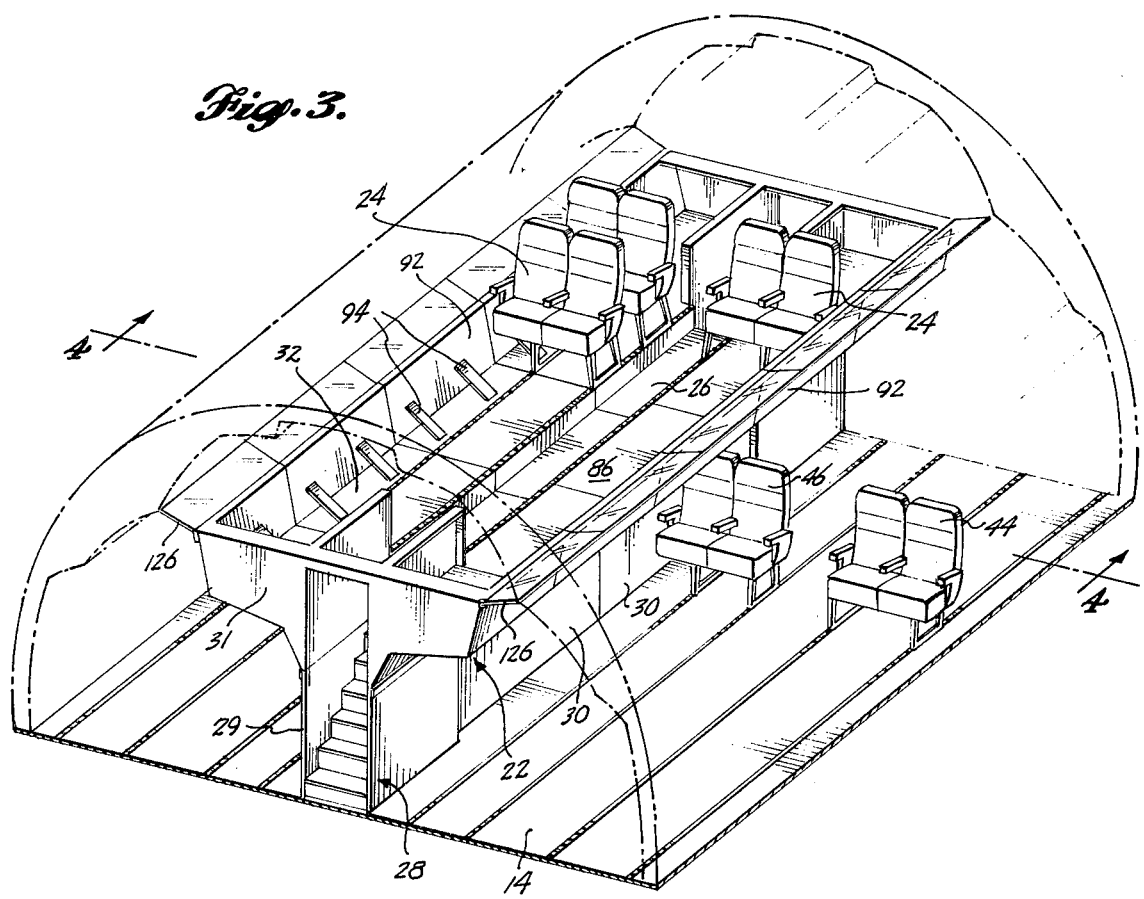
FIG. 3 is a pictorial view of a section of fuselage illustrating one embodiment of the elevated seating structure according to the instant invention disposed on the main deck floor of the aircraft.

Referring initially to FIGS. 1 and 2, wide-bodied aircraft 10 is provided with a fuselage 12 and a substantially horizontal main deck 14 extending longitudinally along the length of fuselage 12. As is known, fuselage 12 is essentially shaped like a closed cylinder and includes a sidewall 13 which converges near each end of aircraft 10. Accordingly the interior of fuselage 12 has a substantially circular cross-section which decreases both near the nose and tail portion of the aircraft 10. One or more passenger doors 16 are provided in sidewall 13 of fuselage 12 for passenger ingress and egress. A plurality of longitudinally spaced windows 18 are normally disposed in sidewall 13 of fuselage 12 adjacent passenger compartment 20 to provide an outward view for the passengers.

In preferred form, mezzanine seating structure 22 according to the instant invention is longitudinally positionable within passenger or fuselage compartment 20 of aircraft 10 along the center line of main deck floor 14 for increasing the overall seating capacity of aircraft 10. A plurality of longitudinally spaced seats 24 are provided atop mezzanine seating structure 22 and are situated on either side of a centrally disposed aisle 26. A stairway 28 is provided, preferably at each end of mezzanine seating structure 22, and allows passengers to walk up from the cross aisles on main deck floor 14 to aisle 26 at the mezzanine level.

Figure 4:
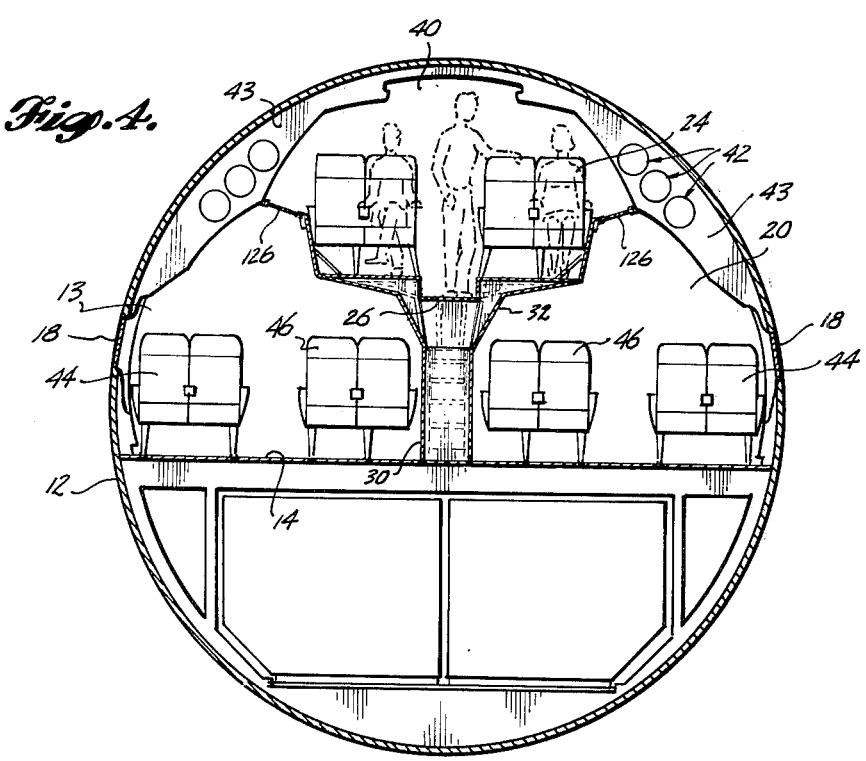
FIG. 4 is a cross-sectional view of the mezzanine structure taken along line 4—4 of FIG. 3 with the addition of passengers in broken line.

Referring now to FIGS. 3, 4 and 7, one embodiment depicting a shortened version of mezzanine seating structure 22 situated on a section of main deck 14 is illustrated. In preferred form, mezzanine seating structure 22 is longitudinally segmented and comprises a plurality of elongated support wall sections 30 which are positionable along the longitudinal axis of main deck 14 substantially midway between sidewalls 13 of fuselage 12. Each section 30 is provided with vertically planar ends so that adjacent sections can be contiguously situated end-to-end thus forming an elongated support wall which supports the weight of passengers in mezzanine seats 24 and the stresses resulting from acceleration and deceleration of aircraft 10. A plurality of mezzanine floor or floor frame sections 32 are disposed atop support wall sections 30 and project laterally outwardly over either side thereof towards circular sidewall 13 of fuselage 12. Each mezzanine floor section 32 also has substantially vertical planar ends and is contiguously positioned end-to-end atop support wall members 30.

As previously indicated each mezzanine seating structure 22 is provided with at least one stairway 28 for passenger movement between the main deck 14 and the mezzanine level. In preferred form, stairway 28 is formed in two parts, both of which are sized to be received through passenger door 16, comprising a lower stairway portion 29 and upper stairway portion 31. Lower portion 29 includes a pair of vertically planar side panels 34 which are attached to either side of stairway portion 29. Upper stairway portion 31 includes the top few stairs (FIG. 7) forming the upper part of the stairway and, in addition, end wall 38. Upper stairway portion 31 is adapted to be attached atop side panels 34 and also to be positioned against an end of a mezzanine floor section 12 as an end railing for the elevated passenger area.

Referring now to FIGS. 1-4, it will be seen that mezzanine seating structure 22 utilizes the heretofore generally unused upper lobe 40 of fuselage 12 to provide an elevated or mezzanine seating area, but only occupies a minimum amount of area for passenger seating on main deck floor 14. At the same time, since mezzanine seating structure 22 is freestanding and requires no lateral support, the passengers in mezzanine seats 24 have visual access over either side of mezzanine seating structure 22 of both the main deck area and a number of outside windows 18. This is particularly advantageous since it allows mezzanine passengers to be visually part of the main deck and provides an outside downwardly view through windows 18.

A particular advantage of mezzanine seating structure 22 is its adaptability which allows it to be utilized in existing passenger compartments 20 with minimal modification to the already existing seating configuration on main deck 14 yet it can be installed or removed as needed in a short period of time. Referring again to FIGS. 1 and 2, a single class seating configuration is illustrated for a wide-bodied aircraft 10 in which a maximum number of passenger seats are provided both on main deck floor 14 and on three separate mezzanine seating structures 22. With this single class interior, a plurality of laterally adjacent pairs of outboard seats 44 are provided near each sidewall 13 of the fuselage 12 in longitudinal columns which extend almost the entire length along each side of the passenger compartment 20. As the aircraft tapers at each end of fuselage 12, a single seat is often used rather than the wider pair of laterally adjacent seats. A plurality of pairs of inboard seats 46 are provided on each side of the passenger compartment 20 adjacent the longitudinal axis thereof. Separating each outboard pair of seats 44 and each inboard pair of seats 46 is a main deck aisle 48, one of which extends longitudinally along either side of passenger compartment 20 and vertically beyond the mezzanine floor level. A plurality of cross aisles 50 are provided at longitudinally spaced intervals and extend laterally across passenger compartment 20 intersecting both main deck aisles 48. Passenger door 16 is normally situated in sidewall 13 of fuselage 12 at either end of each cross aisle 50 so that there will be smooth passenger flow and sufficient door area for routine loading and emergency evacuation.

As illustrated in FIG. 2, positioning of mezzanine seating structure 22 on main deck 14 merely requires the removal of the center column of seats which is along the longitudinal axis of passenger compartment 20. Passengers then entering the aircraft through door 16 could quickly walk along each cross aisle 50 toward the center of passenger compartment 20 and climb mezzanine stairway 28 to the mezzanine level. Lavatories 52 are already disposed adjacent cross aisle 50 and would be accessible to either the passengers on main deck floor 10 or to the passengers coming down stairway 28 from the mezzanine level.

Figure 5:
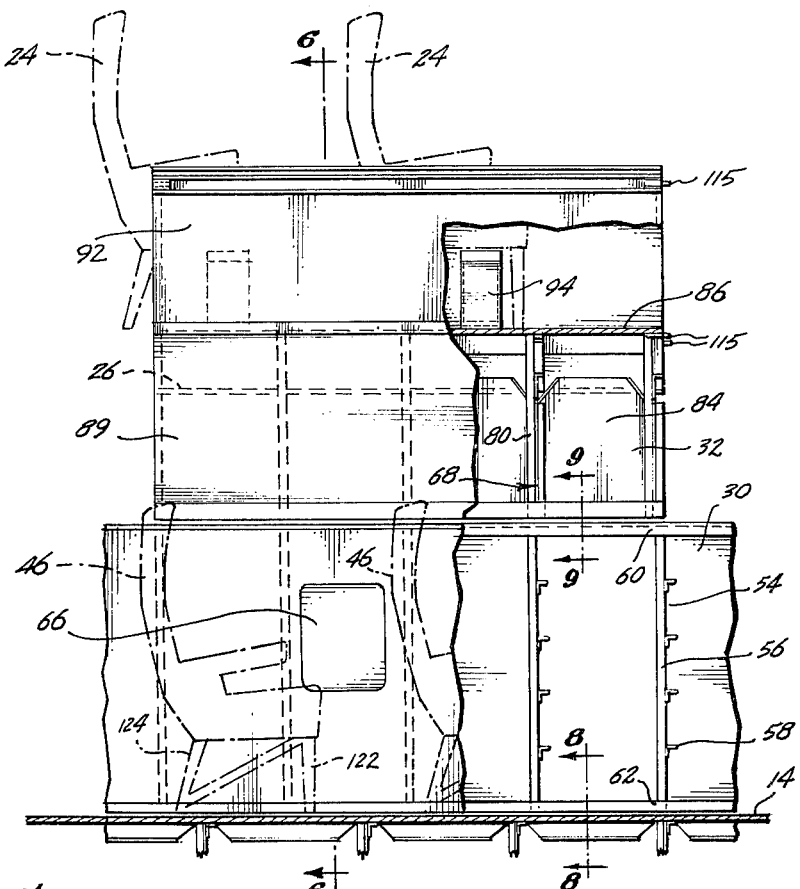
FIG. 5 is an enlarged side elevational view, in fragment, illustrating the internal structural features of the elevated deck structure.
Figure 6:
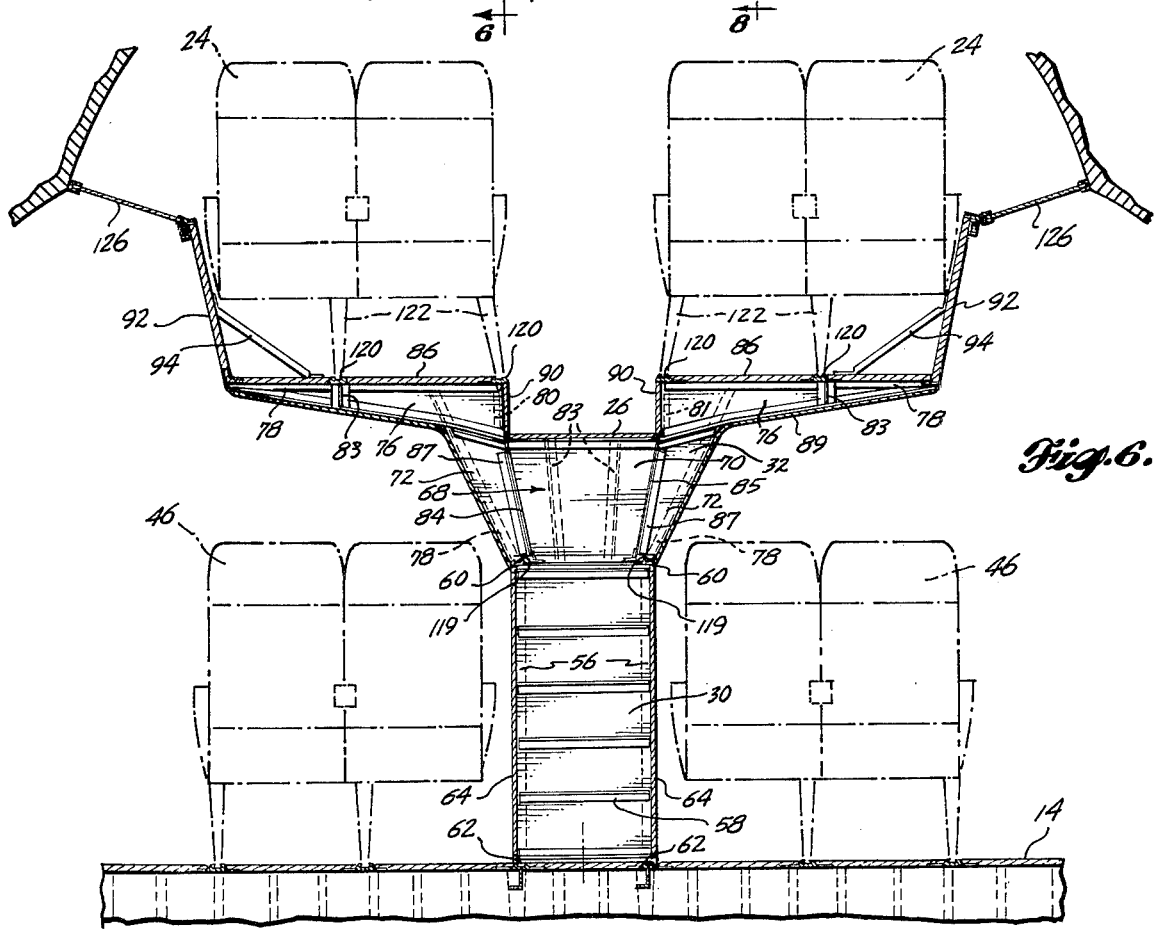
FIG. 6 is a cross-sectional view taken along line 6—6 of FIG. 5.

In preferred form, each mezzanine wall section 30, shown in detail in FIGS. 5 and 6, is sized to be received through passenger door 16 and comprises a plurality of rectangularly shaped ribs 54 which are situated on edge in a longitudinally spaced configuration. An L-shaped reinforcing flange member 56 is secured to one planar face of each rib 54 immediately adjacent the outer side edges thereof. A plurality of reinforcing stiffeners 58 are secured to the opposite face of each rib 54 and extend laterally between vertical flanges 56 at opposite side edges thereof. A pair of upper and lower corner members 60 and 62 (FIG. 5), respectively, are provided and extend horizontally along the laterally outward upper and lower corners, respectively, of each mezzanine wall section 30. Each upper and lower end of each reinforcing flange 56 is attached along the length of the horizontally extending corner members 60 and 62 forming framework which is relatively light yet can support the weight and inertial loading caused by the passengers in the mezzanine area. A sidewall 64 is provided on each side of wall section 30 and is attached along its upper and lower edge to each upper and lower corner members 60 and 62, respectively. In preferred form, each sidewall 64 is fabricated from a "honeycomb" panel which is lightweight yet withstands the stresses caused by the weight of the passengers in the mezzanine area. A rectangular opening 66 (FIG. 5) is preferably provided in each sidewall adjacent inboard seat 46 to provide access to a stowage area within each wall section 30.

Still referring to FIGS. 5 and 6, the component parts of the mezzanine floor assembly disposed atop the longitudinal wall will now be described. As indicated herebefore, the mezzanine floor assembly is sectioned and comprises a plurality of mezzanine floor sections 32 positioned end-to-end atop the longitudinal wall. In preferred form, each mezzanine floor section 32 comprises a plurality of ribs 68 which are spaced longitudinally in the interior thereof. Each rib 68 has a base or central portion 70 (FIG. 6) with a lower edge and a pair of lateral side edges 72. Each side edge 72 extends upwardly from the bottom edge of central portion 70 and is inclined laterally outwardly. A pair of arm portions 76 (FIG. 6) are situated at the top of each rib 68 so that each arm projects laterally outwardly creating a cantilever type support member.

A plurality of sections of reinforcing flange 78 are preferably provided along the outward edges of one face of each rib 68 to increase the rigidity and weight supporting capability of mezzanine floor section 32. Left and right stiffeners 80 and 81 (FIG. 6), respectively, are situated on one face of rib 68 inwardly of side edges 72 on central portion 70. Each lower end of stiffeners 80 and 81 is attached to the horizontally extending flange 78 situated adjacent the lower edge of central rib portion 70. Flanges 80 and 81 extend upwardly and outwardly and each is attached at its upper end to the reinforcing flange 78 adjacent the top edge of outwardly projecting arms 76. As is best seen in FIG. 6, additional vertical stiffeners 83 may be provided on a face of rib 68 to add strength and rigidity to those portions which bear the greatest part of the stresses due to passenger loading into the mezzanine area which would include those members directly under mezzanine aisle 26 and the supports for passenger seats 24.

In addition to the lateral bracing, each mezzanine floor section is also braced lengthwise to provide a framework which is strong yet light in weight. As indicated herebefore, reinforcing flanges 80 and 81 are attached to one face of rib 68 and extend vertically inwardly of side edges 72. Lengthwise bracing is provided by a corner member 77 (FIG. 9) extending lengthwise along both lower corners and which is secured to each lateral rib 68. In addition, a plurality of left and right webs 84 and 85, respectively, are situated along each left and right side, respectively, of floor section 32. One edge of each web 84 and 85 is attached along left and right reinforcing flanges 80, 81, respectively. A short section of reinforcing flange 87 is provided on the opposite face of each rib 68 and is aligned with each reinforcing flange 80, 81 for attaching the opposite edge of each longitudinal web 84. A side panel 89 is provided along the length of each side of floor section 32 and is attached to reinforcing flange 78 which is adjacent the side edges of rib 68. As is best seen in FIGS. 6 and 7, mezzanine floor 86 is situated atop mezzanine seating structure 22 and is attached to reinforcing flange 78 adjacent the top edge of each rib 68. Aisle 26 divides mezzanine floor 86 and, in preferred form, is slightly lower or recessed below mezzanine floor 86 to provide maximum height for standing passengers. Accordingly, each rib includes a laterally centered rectangular notch in the top portion thereof and aisle member 26 is secured to the reinforcing flange 78 adjacent the bottom edge of the notch. A pair of longitudinally extending aisle sidewalls 90 are provided in each section 32 along either side of aisle member 26 and are secured to reinforcing flanges 80, 81 situated adjacent the end edges of the rectangular notch.

As is best seen in FIGS. 5-7, a mezzanine floor 86 is provided atop mezzanine seating structure 22, and is adapted to provide an elevated area for passenger seating. In the preferred embodiment each floor section 32 is also provided with a sidewall 92 which extends along the laterally outward edge of either side thereof. The bottom of each sidewall 92 is attached to extend upwardly and outwardly toward cylindrical sidewall 13 of fuselage 12. A plurality of angularly inclined braces 94 are provided and are spaced longitudinally to stabilize each sidewall 92. Each brace 94 is preferably a planar sheet of material and is secured at one end to mezzanine floor 86 and, at its opposite end to sidewall 92. Braces 94 are spaced apart a sufficient distance so that they can be disposed under adjacent mezzanine seats 24.

As has been earlier indicated, mezzanine structure 22 comprises a plurality of wall sections 30 and floor sections 32 which can be detachably positioned along main deck floor when needed. Each wall section 30 is adapted to be releasably secured to the conventional seat tracks extending along the centerline of the aircraft. Referring now to FIGS. 7, 8, 10 and 11, the positioning of a wall section 30 on main deck 14 will now be described. Each wall section 30 includes a plurality of anchor bolts 96 preferably grouped in pairs and situated along the bottom of each section adjacent either side thereof. As is known and as best seen in FIGS. 10 and 11, a conventional seat track 98 comprises a lower slot 100 sized to loosely receive a head portion 102 of anchor bolt 96. Inwardly extending lips 104 are disposed above slot 100 and are spaced apart a sufficient distance to loosely receive a shank portion 106 of anchor bolt 96. A plurality of circular openings 108 are provided in lips 104 at spaced distances corresponding to the distance separating the individual bolts of each pair of anchor bolts 96.

Each wall section is sized to be carried through passenger door 16 and is positioned along the centerline of main deck 14 with the head portion 102 of each anchor bolt 96 in circular opening 108. The structure is then moved slightly longitudinally to position shank 106 between the more narrow portion of lip 104 between adjacent openings. A shear pad 110 is then positioned in the opening between each pair of anchor bolts 96 locking the floor section against longitudinal movement. A washer 112 and nut 114 are finally threaded onto the threaded end of each shank 106 locking the wall section to its seat track.

After the desired number of wall sections have been attached to longitudinal seat tracks on main deck 14 in the appropriate section of passenger compartment 20, a number of floor sections 32, also sized to be received through passenger door 16, are carried into the passenger compartment and situated atop the supporting wall. Referring now to FIGS. 5 and 9, a pair of longitudinally extending seat tracks 116 are disposed along the top of each wall section 30 and each floor section 32 is detachably secured thereto. In preferred form, each seat track 116 may be formed as a portion of left and right lengthwise extending corner members 60. A plurality of tapered pins 115 (FIG. 7) are provided on one end face of each wall section 30 and are received into guide openings (not shown) on the abutting end face of the adjacent wall section. Similarly to that heretofore described, in conjunction with the installation of wall sections 32, a plurality of anchor bolts 118, also preferably grouped in pairs, are spaced apart along the bottom of each floor section 32 adjacent each side thereof. A head portion 119 of each anchor bolt 118 is first positioned with each seat track 116 and the entire floor section is then moved longitudinally to position the anchor bolts in between the head receiving openings. A bolt 121, washer 123, and shear pad 125 lock each floor section 32 in seat tracks 116 securing the floor sections atop the longitudinally extending wall. Stairway 28 is then positioned against each end of wall section 30 and is also locked into seat tracks in the same manner as hereabove described in conjunction with floor section 30.

The final steps in the assembly of mezzanine seating structure 22 involve the positioning of mezzanine seats 24 on mezzanine floor 86 adjacent aisle member 26. As is best seen in FIGS. 6 and 7, a pair of longitudinally extending seat tracks 120 are preferably situated on mezzanine floor 86 at the top of each section 32. Each pair of mezzanine seats 24 is provided with a pair of front supporting legs 122 and rear supporting legs 124 (FIG. 5). At the lower end of each leg a pair of anchor bolts (not shown) is provided to secure each pair of seats 24 to mezzanine seating structure 22 in the same manner as hereabove described. Upper stairwell 31 is then attached atop lower stairway 29 completing assembly of mezzanine seating structure 22.

It should be understood that although in preferred form mezzanine seating structure 22 is secured only at its lower portion to the main deck of the aircraft, if desired, lateral bracing could be provided which would additionally laterally support the structure within the passenger compartment. Preferably, such braces would be spaced apart longitudinally along either side of the mezzanine structure and would be attached, at one end, to the outward extending portion of each mezzanine floor section 32 and, at the opposite end, to the frames of aircraft fuselage 12. Each brace would ideally be sized as small as possible in order not to interfere with visual access from the mezzanine level of the passenger compartment.

As is best seen in FIGS. 3, 4 and 6, the final step of assembly involves the positioning of a transparent barrier 126 at the top of sidewall 92 so that it extends laterally outwardly to cylindrical sidewall 13 of fuselage 12. As has been indicated herebefore, the mezzanine seating structure of the instant invention provides an elevated seating area which is physically separated from but visually a part of passenger compartment 20. Accordingly, transparent barrier 126 allows visual access for the passengers seated in the mezzanine area yet provides physical separation between the respective compartments. This separation reduces any temperature gradient between the upper mezzanine area and the lower main deck area by reducing airflow therebetween thus allowing each compartment to be separately air conditioned.

As will be appreciated by those of ordinary skill in the art, modification only to the interior of a wide-bodied passenger aircraft is required to accommodate mezzanine seating structure 22. In such current single deck aircraft, upper lobe 40 is generally used for passenger service units, storage bins and the like, in addition to parts of the air-conditioning system. As is best seen in FIG. 4, main deck 14 is normally situated within fuselage 12 slightly below the center line of fuselage 12 so that passenger compartment 20 will be provided with the near maximum amount of lateral spaciousness as is available in a substantially cylindrical structure. It is desirable to provide maximum vertical distance between aisle member 26 of the mezzanine structure and the top of upper lobe 40 for passenger movement therein. Accordingly, such modifications would preferably include repositioning of air-conditioning ducts 42 to extend longitudinally behind the interior lining panels adjacent upper lobe 40. A laterally extending wall 130 (FIG. 1) is also preferably provided at each end of the mezzanine seating structure to physically isolate each mezzanine area from main passenger compartment 20 enhancing the airflow separability and, where more than one such structure is utilized, from the adjacent mezzanine areas.

In addition to the hereabove indicated modifications to the passenger compartment of a wide-bodied aircraft, it is also desirable to strengthen main deck floor 14 by introducing heavier gauge floor beams or otherwise increasing the load bearing capability of the deck floor support structure. Wide-bodied aircraft configured for transporting freight normally have increased strength floor beams to accommodate heavy cargo. Accordingly, the details of such structural modifications would be well-known to those of ordinary skill.

It should be understood that the invention may be embodied in other specific forms without departing from the spirit or central characteristics thereof. The present embodiments, therefore, are to be considered in all respects as illustrative and not restrictive and the invention is not to be limited to the details described heretofore but may be modified within the scope of the appended claims.

What is claimed is:

1. An elevated deck structure movable into a fuselage compartment of an aircraft, said fuselage compartment including a main deck floor and sidewalls with windows, for providing a mezzanine within such fuselage compartment, said elevated deck structure comprising:
   an elongated support wall having a bottom portion securable to the main deck floor of the fuselage compartment with said support wall substantially centered laterally within the fuselage compartment, and a top;
   a mezzanine floor frame connected to the upper portion of said support wall and projecting laterally outwardly from said support wall in a centilevered fashion, on both sides thereof, for providing a longitudinally extending mezzanine floor area; and
   said mezzanine floor frame being narrower than the inner dimension of the fuselage compartment at the level of said mezzanine floor area, so as to leave a spacing between each sidewall and the mezzanine floor frame, said spacing being utilized to provide head room for main deck aisle space on each side of the mezzanine floor frame, said head room extending above the level of the mezzanine floor area.

2. An elevated deck structure according to claim 1, further comprising at least one stairway built into a portion of said elongated support wall, and wherein said stairway includes an upper end opening onto said mezzanine floor area, and a lower end opening onto said main deck floor, said stairway providing passenger ingress and egress between the main deck floor and the mezzanine floor area.

3. An elevated deck structure movable into a passenger compartment of an aircraft, said passenger compartment including a main deck floor and side walls with windows, for providing a mezzanine within such passenger compartment, said elevated deck structure comprising:
   an elongated support wall having a bottom portion securable to the main deck floor of the passenger compartment with said support wall substantially centered laterally within the passenger compartment, and a top;
   a mezzanine floor frame connected to the upper portion of said support wall and projecting laterally outwardly from said support wall in a cantilevered fashion, on both sides thereof, for providing a longitudinally extending mezzanine floor area;
   said mezzanine floor frame being spaced above the main deck floor a sufficient distance to provide for passenger seating on the main floor on each side of said support wall and in the space above the mezzanine floor frame;
   said mezzanine floor frame being narrower than the passenger compartment is wide at the level of said mezzanine floor frame within the passenger compartment, so as to provide main deck aisle space on each side of the mezzanine floor frame, each said main deck aisle space including head room extending above the level of the mezzanine floor area;
   a centrally disposed aisle extending longitudinally on said mezzanine floor area; and
   a plurality of seats spaced longitudinally on said mezzanine floor area adjacent said aisle, wherein passengers seated therein have visual access over the outward edges of said elevated deck structure to the main deck portion of the passenger compartment.

4. An elevated deck structure movable into a passenger compartment of an aircraft, said passenger compartment including a main deck floor and side walls with windows, for providing a mezzanine within such passenger compartment, said elevated deck structure comprising:
   an elongated support wall having a bottom portion securable to the main deck floor of the passenger compartment with said support wall substantially centered laterally within the passenger compartment, and a top;
   a mezzanine floor frame connected to the upper portion of said support wall and projecting laterally outwardly from said support wall in a cantilevered fashion, on both sides thereof, for providing a longitudinally extending mezzanine floor area;
   said mezzanine floor frame being spaced above the main deck floor a sufficient distance to provide for passenger seating on the main floor on each side of said support wall and in the space above the mezzanine floor frame;
   said mezzanine floor frame being narrower than the passenger compartment is wide at the level of said mezzanine floor frame within the passenger compartment, so as to provide main deck aisle space on each side of the mezzanine floor frame, each said main deck aisle space including head room extending above the level of the mezzanine floor area; and
   said elongated support wall comprising a plurality of longitudinally segmented sections positionable end-to-end on said main deck floor, each section having substantially vertical planar ends and including a bottom portion adapted to be detachably secured to said main deck floor in said passenger compartment, and wherein said mezzanine floor frame also comprises a plurality of longitudinally segmented sections with substantially vertical planar ends, each said floor frame section adapted to be detachably secured to the upper portion of a related one of said wall sections, and wherein each of said wall sections and each of said mezzanine floor frame sections are sized to be movable through a conventional passenger door in the side wall of the aircraft.

5. An elevated deck structure according to claim 4, wherein each wall section further includes a pair of upper and lower corner members extending longitudinally adjacent the top and bottom corners of said wall section, each corner member being secured to flanges situated adjacent the edges of a plurality of spaced ribs, and wherein a substantially rectangular side panel is disposed along the length of each side of said support wall, and wherein each upper and lower edge of said side panel is secured to said corner members and each of said flanges situated along the outer edge of said longitudinally spaced ribs adding strength and rigidity thereto.

6. An elevated deck structure according to claim 4, whrein each of said segmented mezzanine floor frame sections comprises a plurality of ribs spaced lengthwise along the underside of said mezzanine floor area, and wherein each rib includes a centrally disposes portion with angularly inclined side edges, and a pair of triangular arms projecting laterally outwardly from either side of said central portion, and wherein each rib further includes a plurality of stiffening flanges secured adjacent the edge of each rib.

7. An elevated deck structure according to claim 6, wherein each of said spaced ribs of each mezzanine floor frame section further comprises a laterally centered rectangular notch in each upper edge thereof, and wherein each mezzanine floor frame section further includes a planar aisle member extending longitudinally in said rectangular notch of each mezzanine floor frame section.

8. An elevated deck structure according to claim 6, wherein each of said segmented mezzanine floor frame sections further includes a plurality of webs extending longitudinally between said spaced ribs, and wherein each mezzanine floor frame section further includes left and right vertically disposed flanges attached to each rib inwardly of each side edge thereof, each end of each of said left and right vertically disposed flanges being secured to a portion of said edge flange adjacent the top and bottom edge of each rib.

9. An elevated deck structure according to claim 4, wherein each wall section includes a plurality of vertical planar ribs spaced longitudinally along the axis thereof, and wherein each rib includes a plurality of reinforcing flanges situated adjacent the edges thereof, and wherein each rib further includes a plurality of vertically spaced reinforcing stiffeners extending horizontally between said flanges situated on opposite side edges of each rib.

10. An elevated deck structure movable into a passenger compartment of an aircraft, said passenger compartment including a main deck floor and side walls with windows, for providing a mezzanine within such passenger compartment, said elevated deck structure comprising:
an elongated support wall having a bottom portion securable to the main deck floor of the passenger compartment with said support wall substantially centered laterally within the passenger compartment, and a top;
a mezzanine floor frame connected to the upper portion of said support wall and projecting laterally outwardly from said support wall in a cantilevered fashion, on both sides thereof, for providing a longitudinally extending mezzanine floor area;
said mezzanine floor frame being spaced above the level of said windows and also above the main deck floor a sufficient distance to provide for passenger seating on the main floor on each side of said support wall and in the space above the mezzanine floor area;
said mezzanine floor frame being narrower than the passenger compartment is wide at the level of said mezzanine floor frame within the passenger compartment, so as to provide main deck aisle space on each side of the mezzanine floor frame, each said main deck aisle space including head room extending above the level of the mezzanine floor area, and also to permit light from said windows to travel between the sides of said mezzanine floor frame and each side wall of the passenger compartment.

11. An elevated deck structure according to claim 10, further including a plurality of longitudinally spaced braces secured between a plurality of mezzanine sidewalls and said mezzanine floor frame for providing lateral stability to said mezzanine sidewalls, said braces being adapted to be substantially positioned within the area under each of a plurality of longitudinally spaced seats when passenger seats are disposed in said mezzanine floor area.

12. An elevated deck structure according to claim 10, wherein said mezzanine further includes a plurality of transparent barriers, adapted to be disposed between the top of each of a plurality of mezzanine sidewalls and each sidewall of said passenger compartment.

13. An elevated deck structure movable into a passenger compartment of an aircraft, said passenger compartment including a main deck floor and side walls with windows, for providing a mezzanine within such passenger compartment, said elevated deck structure comprising:
an elongated support wall having a bottom portion securable to the main deck floor of the passenger compartment with said support wall substantially centered laterally within the passenger compartment, and a top;
a mezzanine floor frame connected to the upper portion of said support wall and projecting laterally outwardly from said support wall in a cantilevered fashion, on both sides thereof, for providing a longitudinally extending mezzanine floor area;
said mezzanine floor frame being spaced above the main deck floor a sufficient distance to provide for passenger seating on the main floor on each side of said support wall and in the space above the mezzanine floor area;
said mezzanine floor frame being narrower than the passenger compartment is wide at the level of said mezzanine floor frame within the passenger compartment, so as to provide main deck aisle space on each side of the mezzanine floor frame, each said main deck aisle space including head room extending above the level of the mezzanine floor area; and
said elongated support wall includes means, situated at the bottom portion thereof, adapted to be secured to seat tracks disposed on the main deck floor of the passenger compartment.

14. An elevated deck structure according to claim 13, wherein said means situated on the bottom portion of said elongated support member wall comprises at least one pair of anchor bolts situated on either side thereof, wherein the anchor bolts are longitudinally spaced apart, and each anchor bolt includes a head portion adapted to be received and held within the seat tracks disposed on the main deck floor of the passenger compartment.

15. In a wide-bodied aircraft for carrying passengers including a passenger compartment extending longitudinally within the fuselage of the aircraft, said passenger compartment further including a main deck defining a floor for said passenger compartment, said main deck extending laterally to the interior sidewall of said passenger compartment, a plurality of longitudinally spaced windows in said fuselage adjacent said passenger compartment and wherein said main deck floor further includes a plurality of laterally extending rows of spaced seating spaced longitudinally on the main deck floor of the passenger compartment, and wherein said main deck further includes at least one pair of laterally spaced seat tracks secured along the center line of said main deck for receiving seating therein, the improvement comprising an elevated deck structure for converting the substantially unused space in the upper lobe of the fuselage for passenger seating, comprising:

an axially elongated support wall having a bottom portion detachably securable to said laterally spaced seat tracks disposed along the center line of said main deck;

a mezzanine floor having laterally outward edges, and connected to the upper portion of said support wall, said edges projecting outwardly over either side of said support wall in a cantilevered fashion over said main deck;

seat fastening means situated on said mezzanine floor, adapted to receive a plurality of longitudinally spaced seats therein, so that passengers seated in said seats have visual access over said outward edge of said mezzanine floor of the windows in said fuselage adjacent said passenger compartment; and, whereby seats disposed in the seat fastening means use the generally unused space in the upper lobe of the passenger compartment to provide an area for passenger seating.

16. The improvement according to claim 15, wherein said elongated support wall further includes at least one pair of anchor bolts situated on either side thereof on the bottom, each pair of anchor bolts being adapted to be secured in one of said longitudinally extending seat tracks situated on said main deck floor.

17. The improvement according to claim 15, wherein said elongated support wall comprises a plurality of longitudinally segmented sections, each section detachably securable to said pair of longitudinally extending seat tracks on said main deck floor, and wherein said mezzanine floor comprises a plurality of longitudinally segmented sections, each section being adapted to be detachably secured to the upper portion of said wall sections, and wherein each of said wall and mezzanine floor sections are sized to be received through a conventional passenger door in the sidewall of an aircraft.

18. The improvement according to claim 15, further comprising at least one stairway situated longitudinally on the main deck floor of said passenger compartment adjacent to said support wall, said stairway including a bottom portion which is adapted to be detachably secured to said longitudinally extending seat tracks, and wherein said stairway is sized to be received through a conventional passenger door in the sidewall of the aircraft.

* * * * *